July 27, 1965  A. H. LAVILLE ETAL  3,196,612
METHOD AND APPARATUS FOR STARTING GAS TURBINE
DRIVEN HELICOPTER ROTORS
Filed June 26, 1963  3 Sheets-Sheet 1

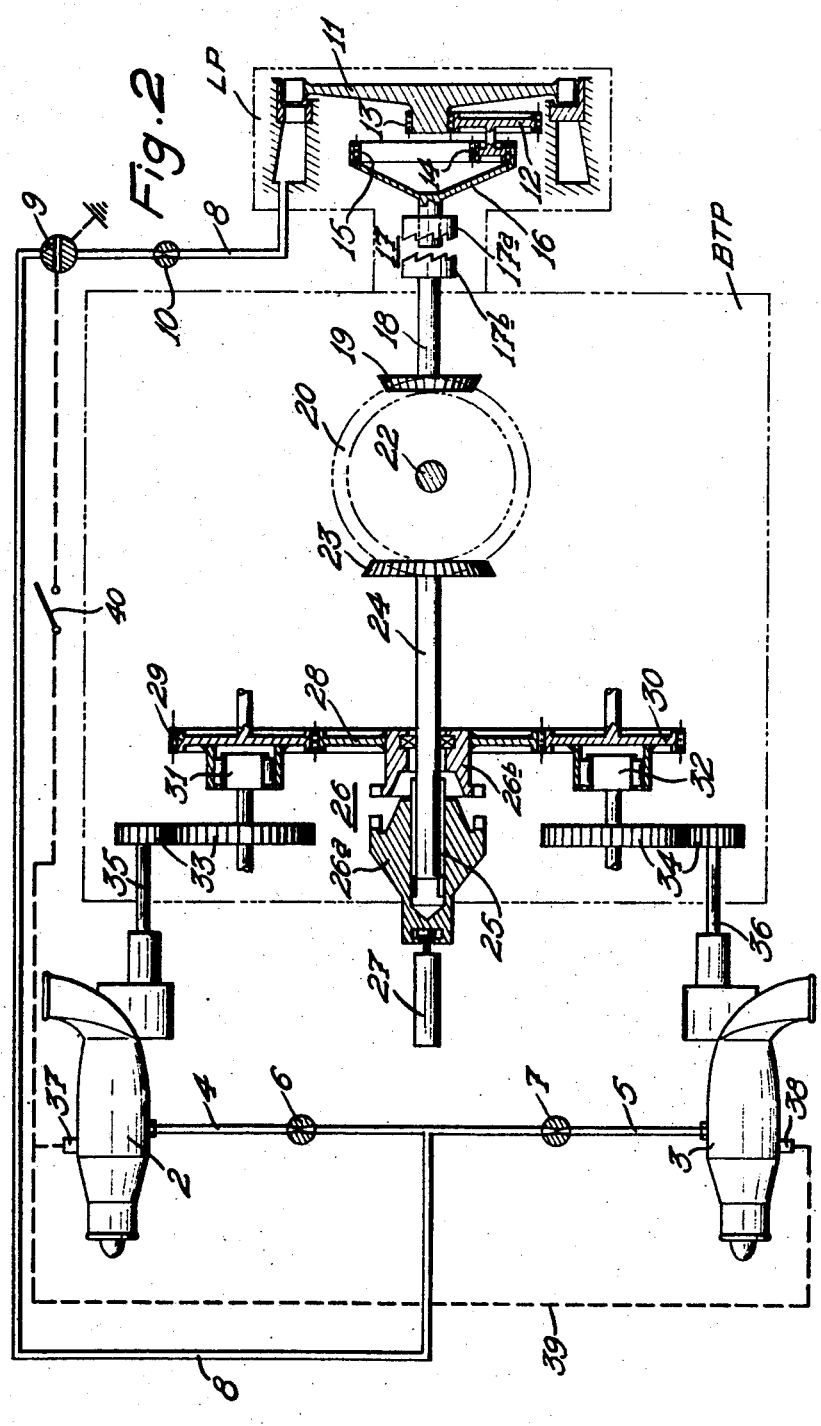

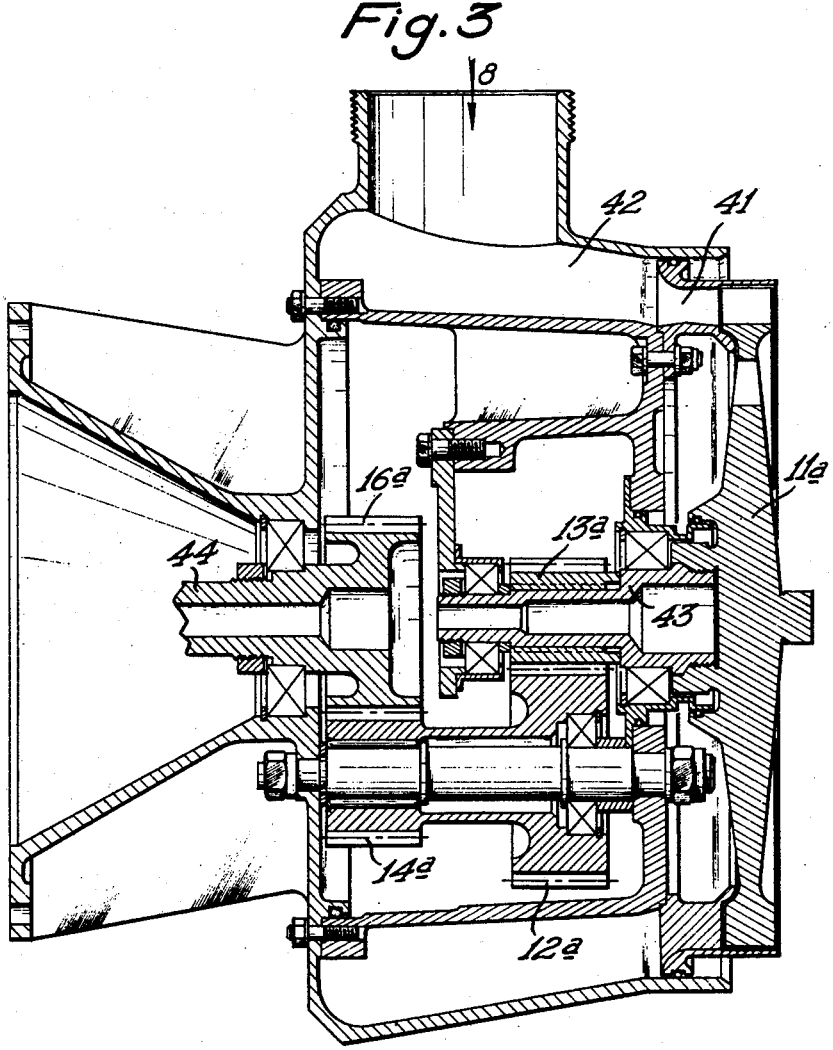

United States Patent Office 3,196,612
Patented July 27, 1965

3,196,612
METHOD AND APPARATUS FOR STARTING GAS TURBINE DRIVEN HELICOPTER ROTORS
André Henri Laville, Enghien, and Francis Henri Marie Joseph Maillard, Courbevoie, France, assignors to Sud-Aviation Société Nationale de Constructions Aeronautiques, Paris, Seine, France
Filed June 26, 1963, Ser. No. 290,818
Claims priority, application France, July 2, 1962, 902,634, Patent 1,337,306
9 Claims. (Cl. 60—39.18)

With most helicopters in which the rotor is driven by gas turbines, the power is transmitted to the rotor mechanically through a mechanical or hydraulic clutch, both for starting and in actual flight. In the case of use of a mechanical clutch, serious difficulties are encountered in working out the procedure for starting the rotor, because of the fierceness of operation of such clutches, the local temperature rises they occasion and the shock loadings they impose on the turbines. When a hydraulic clutch is used, similar difficulties arise due to the hydraulic fluid capacity required and the rapid heating sustained by the fluid, which in turn make it mandatory to lay down a very strict starting drill in order to avoid excessive heating and the possible need for a cooling system.

In any event, whichever method of transmission is resorted to, should a mistake cause a rotor start to be aborted, a minimum delay is inevitable before a fresh start can be attempted.

However, helicopters with turbo-compressor-driven rotors are known wherein the rotor, instead of being driven by mechanical or hydraulic means, is continuously driven by turbines for which the driving fluid is air bled from the compressors of the turbine engines.

With a view to overcoming the aforementioned drawbacks in starting the rotors of turbine-powered helicopters equipped with mechanical or hydraulic drive for transmitting power to said rotors, and endowing such rotors for the starting operation with the progressiveness and instantaneousness of operation inherent in the latter-mentioned type of power transmission, the present invention has for its object a method of starting the rotor of such helicopters wherein air bled from the outlets of the compressor or compressors of the operative but declutched gas turbine or turbines is utilized as the driving fluid for starting and speeding up the rotor, which rotor is subsequently connected to said turbine or turbines through the conventional mechanical or hydraulic drive, whereby to take advantage of the flexibility of compressed air as a means of transmitting the starting power.

The invention further has for its object a pneumatic starter for helicopter rotors driven by a gas turbine or turbines, whereby to perform the method hereinbefore specified, which starter comprises an air-driven starting turbine supplied with flow limited and regulated compressed air bled from the outlets of the compressor or one at least of the compressors of the driving gas turbines, which turbines are previously declutched from the main transmission box coupled to the rotor, then started up, and an automatic dog-clutch means operated by said air turbine whereby to drive the rotor through said box, which box includes a freewheel device or devices for linking the gas turbine or turbines to a controlled dog-clutch after the rotor has been started and the starter declutched, whereby to drivingly couple said gas turbine or turbines to said rotor.

A pneumatic starter according to the present invention circumvents the aforementioned drawbacks. In addition, it provides a worthwhile saving in weight, for a given power, since it reduces the starting forces involved, dispenses with a slipping clutch (replaced by a plain dog-clutch) and does not call for undue generation of driving fluid, the same being bled simply from the declutched turbine or turbines within the limits tolerated thereby.

The description which follows with reference to the accompanying drawings, which are filed by way of non-limitative examples, will give a clear understanding of how the invention can be carried into practice and will disclose still further particularities thereof.

In the drawings:

FIG. 1 schematically illustrates the manner of adapting a pneumatic rotor starter according to the invention to a twin-turbine-engined helicopter;

FIG. 2 shows in schematic plan view, in the halted position, the helicopter driving turbines and their couplings respectively to the pneumatic rotor starter and the controlled dog-clutch for drivingly connecting them to the starter and speed-up rotor;

FIG. 3 shows in section an embodiment of a pneumatic rotor starter according to the invention.

Figure 1:
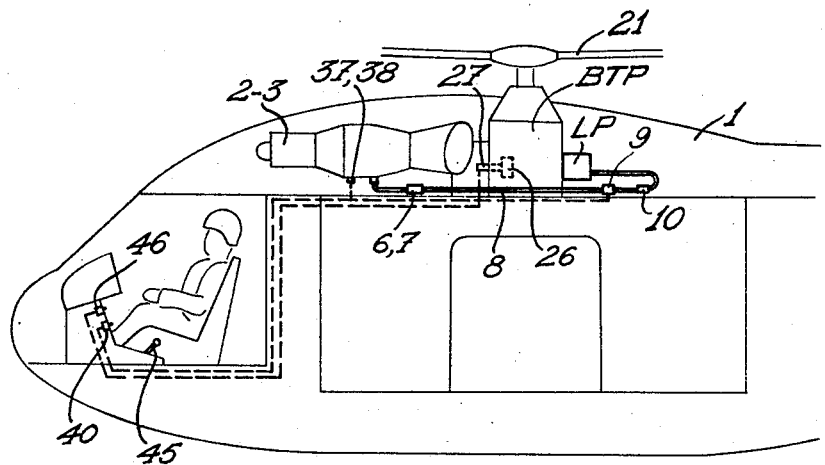

Reference is first had to FIGS. 1 and 2, wherein the powerplant driving the helicopter 1 consists of two turbines 2 and 3 with associated stators. At the outlet sides of the compressors of these turbines is tapped a compressed air circuit comprising two pipes 4 and 5 which incorporate flow limiters 6 and 7 and are connected to a main pipe 8 into which are inserted in series an electrically operated valve 9 and a flow limiter 10 operating as a flow regulator.

Pipe 8 has port in a pneumatic starter LP consisting of an air turbine 11 the speed of which is demultiplied by a reduction gear-box comprising a gearwheel 12 driven by a toothed rim 13 which is supported on turbine 11 and is coupled to a pinion 14 which meshes with the interior cogs 15 of a toothed rim 16 coupled to the moving plate 17a of an automatic dog-clutch or briar-tooth catch 17. The stationary plate 17b of this clutch is coupled through a shaft 18 to the principal transmission box input stage consisting of a bevel pinion 19 which drives the bevelled rim 20 of the principal transmission box BTP normally providing the coupling between turbines 2, 3 and rotor 21, the latter being supported on the rotor shaft 22 driven by said box.

The bevel rim-gear 20 of the principal transmission box further drives a bevel pinion 23 supported on a shaft 24 provided with splines 25 along which is movable the mobile plate 26a of a dog-clutch 26 operated by an electrically controlled jack 27. The stationary plate 26b of dog-clutch 26 supports a gearwheel 28 meshing with two identically sized gearwheels 29 and 30 coupled through freewheels 31 and 32 to gear trains 33 and 34 driven by the output shafts 35 and 36 of turbines 2 and 3.

Two pressure responsive switches 37 and 38 positioned at the exit sides of the turbine compressors are connected through a line 39 to electrovalve 9, a switch 40 being interposed therein.

In the specific embodiment illustrated in FIG. 3, the pneumatic starter consists of single-wheel turbine 11a and a stator 41 supplied with air from the chamber 42 connected to pipe 8. A pinion 13a keyed to the turbine shaft 43 drives a gearwheel 12a rigidly connected to a pinion 14a which in turn drives a gearwheel 16a keyed to the shaft 44 of the automatic dog-clutch driving the rotor.

The design of this starter can be likened to that of compressed-air-type turbojet starters, having regard for the ratios between the inertia torques and engine r.p.m. figures of turbojets and helicopter rotors.

Figure 4:
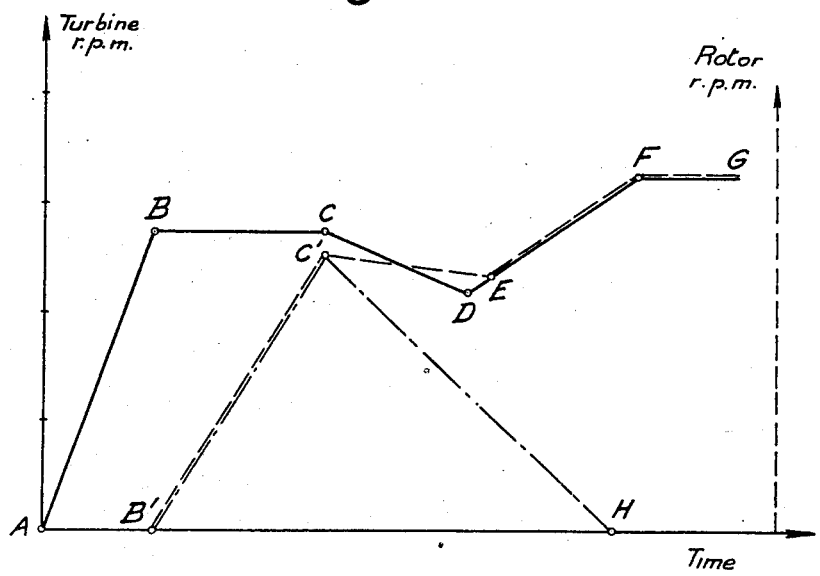
FIG. 4 is a plot of time versus turbine speed, showing the different stages in starting the rotor by means of a pneumatic starter according to the invention.

The apparatus hereinbefore described is used in the following manner, operation being as described with reference to FIGURES 2 and 4, the curve drawn in solid lines in FIG. 4 representing turbine operation, that in broken lines rotor operation and that in dot-dash lines rotor starter operation:

Before turbines 2 and 3 are started, the starter clutch 17 and the main transmission box clutch 26 are uncoupled, the switch 40 being open and electrovalve 9 closed.

The two turbines 2 and 3 are started by any convenient means well known per se, not covered by the scope of the present invention. The turbine compressor output pressure P2 increases over the section AB (FIG. 4) and reaches at B a value which causes mano-contacts 37 and 38 to operate. The pilot then closes switch 40 in order to open electrovalve 9 of the compressed air circuit P2. This compressed air speeds up the starter turbine 11, the r.p.m. of which follows the section B'C' (FIG. 4), thereby causing automatic dog-coupling of plates 17a and 17b through the medium of the reduction gear and rotation of rotor 21 through the bevel coupling 19 until said rotor reaches an adequate r.p.m. figure at C' (FIG. 4). During this time the r.p.m. figure of the driving turbines is maintained constant from B to C (FIG. 4) by the pilot's action on the throttle lever 45 (FIG. 1). The air bleed to the starter turbine is then eliminated by opening switch 40 and consequent closure of electrovalve 9, whereupon turbine 11 is declutched or coasts on down the section C'H (FIG. 4) and rotor 21 likewise coasts on.

A suitable control action then enables said rotor to be "acquired" by the driving turbines 2 and 3. Depending on the characteristics of starter turbine 11 and the speed it has imparted to the rotor, either of two techniques can be resorted to for drivingly connecting the turbines directly to said rotor.

If the speed attained by rotor 21 at the end of the starting phase is greater than that corresponding to the continuous r.p.m. rating of the principal turbines 2 and 3, the same are immediately dog-coupled by the pilot's action on the switch 46 (FIG. 1) controlling jack 27, thereby causing engagement of the plates 26a and 26b of controlled dog-clutch 26. The positive coupling to the turbines is effected spontaneously due to the provision of freewheels 31 and 32, as soon as equality is obtained between the speeds of the turbines and the rotor as the result of the natural deceleration of the latter.

If the speed attained by rotor 21 at C' at the end of the starting phase (FIG. 4) is less than the continuous r.p.m. rating of principal turbines 2 and 3 at C (FIG. 4) by 30 percent say, the turbine r.p.m. is first reduced from C to D (FIG. 4) below the decreasing r.p.m. figure of the rotor, after starter turbine 11 has been stopped and starter LP has been uncoupled as a result thereof. Dog-clutch 26 is actuated by the pilot's operating switch 46, following which the turbines are speeded up from the point D onwards (FIG. 4) until positive drive is achieved at the point E (FIG. 4) through the freewheels 31 and 32 which ensure synchronized rotational speeds of the two clutch plates 26a and 26b. The pilot then operates throttle lever 45 (FIG. 1) in the conventional way to speed up the two turbines 2 and 3 from E to F (FIG. 4) until the rated rotor r.p.m. figure is obtained and maintained thence forward from F to G (FIG. 4). This second technique requires less compressed bleed air and a less powerful starter, but is nevertheless more rapid.

It will of course be understood that various changes can be made to the method and embodiment hereinbefore described, without departing from the scope of the present invention as defined in the appended claims. By way of example, in the case of a plurality of turbines, the air could be bled from the compressor exit side of only one turbine or from the compressor exits of only a certain number thereof.

What we claim is:
1. A process of starting and speeding up the rotor of a helicopter driven by at least one gas turbine engine by means of a drive assembly connected to said rotor having means for clutching and declutching each gas turbine engine from said rotor, said process comprising declutching each gas turbine engine from the drive assembly, speeding up each gas turbine engine to the continuous r.p.m. rating thereof, bleeding compressed air from the outlet of the compressor of at least one gas turbine engine, utilizing said compressed air to start and speed up the rotor, and finally clutching each gas turbine engine with said drive assembly in order to drive the speeded-up rotor.

2. A process according to claim 1, wherein, if the rotation speed attained by the rotor at the end of the starting and speeding-up phase is greater than the continuous r.p.m. rating of each gas turbine engine declutched from the drive assembly, each gas turbine engine is clutched with said assembly following a deceleration of the rotor that follows the initial speeding-up.

3. A process according to claim 1, wherein, if the rotation speed attained by the rotor at the end of the starting and speeding-up phase is less than the continuous r.p.m. rating of each gas turbine engine declutched from the drive assembly, the rotatory speed of each declutched gas turbine engine is lowered below the decreasing rotatory speed of the speeded-up rotor, then the rotatory speed of each declutched turbine engine is increased and each gas turbine engine is clutched with said drive assembly when the increasing rotatory speed thereof is equal to the decreasing rotatory speed of said rotor.

4. A pneumatic starter for the rotor of a helicopter driven by at least one gas turbine engine by means of a transmission connected to said rotor and engine, said transmission being provided with inlet gears, the starter comprising, in combination, an air-type starting turbine, a main pipe connected to said starting turbine for feeding the latter with compressed air from said engine, means in said main pipe for limiting and regulating the compressed air flow therethrough, pipes for bleeding compressed air from the outlet of at least one gas turbine engine to said main pipe, an automatic coupling means inserted between said starting turbine and one of the inlet gears of the transmission, a controlled coupling means connected to another inlet gear of said transmission, means for controlling said controlled coupling means, and a connecting means interposed between said controlled coupling means and each gas turbine engine and having a freewheel means.

5. A pneumatic starter according to claim 4, comprising a reduction transmission interconnecting the air-type starting turbine and the automatic coupling means.

6. A pneumatic starter for the rotor of a helicopter driven by at least one gas turbine engine by means of a transmission connecting said engine and said rotor, said transmission being provided with inlet gears, said starter comprising, in combination, an air-type starting turbine, a main pipe connected to said starting turbine for feeding the latter with compressed air from said engine, means in said main pipe for limiting and regulating the compressed air flow therethrough, pipes for bleeding compressed air from the outlet of at least one gas turbine engine to said main pipe, a first dog-clutch having a movable plate and a stationary plate which is connected to one of the inlet gears of the transmission, a reduction transmission inserted between said air-type starting turbine and the movable plate of said first dog-clutch, a second dog-clutch having a movable plate and a stationary plate, a shaft one end of which is connected to another inlet gear of the transmission and provided at its other end with splines along which is movable the movable plate of said second dog-clutch, a jack connected to said movable plate of said second dog-clutch, means operated by the pilot for controlling said jack, and means for drivingly connecting said stationary plate of said second dog-clutch with each gas turbine engine and having a freewheel.

7. A pneumatic starter according to claim 6, wherein the means for limiting and regulating the compressed air flow through the main pipe comprises an electrically operated valve and a flow regulator inserted in series in said main pipe, a flow limiter in each compressed air bleeding pipe, a pressure responsive switch on the compressor of each gas turbine engine and connected to said main pipe, an electrical circuit for controlling said electrically operated valve, a switch operated by the pilot in said electrical control circuit, and said electrical circuit including each pressure responsive switch.

8. A pneumatic starter according to claim 6, wherein each drivingly connecting means between the stationary plate of the second dog-clutch and a turbine engine comprises two reduction gears connected to said stationary plate and to said gas turbine engine respectively, the freewheel being inserted between said two reduction gears.

9. Apparatus for starting the rotor of a helicopter powered by at least one gas turbine engine having a compressor, said apparatus comprising drive means connecting said gas turbine engine and said rotor, clutch means in said drive means, bleed means for bleeding air from the compressor of the turbine engine, a pneumatic starter connected to said bleed means and being fed with air therefrom, second drive means including a clutch connecting the pneumatic starter and the rotor for driving the same when the engine is declutched from the rotor and means for subsequently clutching said rotor to said turbine engine and simultaneously disconnecting said starter from said rotor.

No references cited.

SAMUEL LEVINE, *Primary Examiner.*